May 21, 1968 — O. E. ELMORE — 3,384,234

DOCUMENT INSPECTION APPARATUS

Filed Oct. 15, 1965 — 6 Sheets-Sheet 1

Inventor:
Owen E. Elmore,
by Wood, Just + Drial
Attorneys.

May 21, 1968   O. E. ELMORE   3,384,234
DOCUMENT INSPECTION APPARATUS
Filed Oct. 15, 1965   6 Sheets-Sheet 2

Inventor:
Owen E. Elmore,
by Hood, Gust & Irish
Attorneys

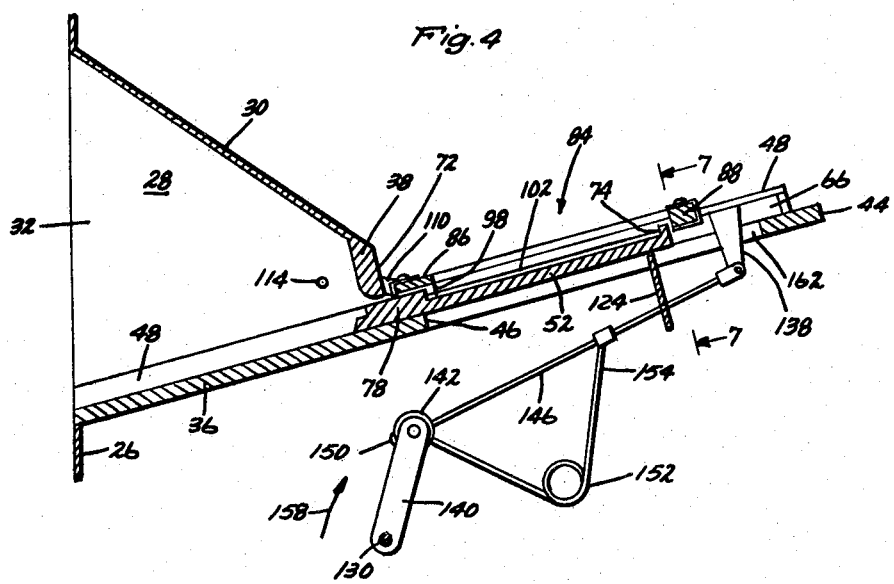
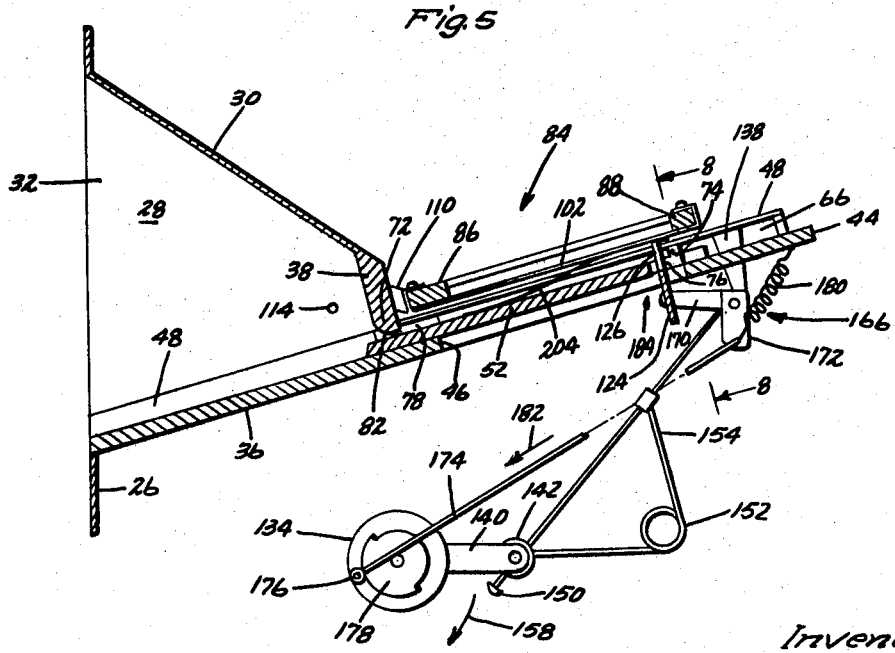

May 21, 1968  O. E. ELMORE  3,384,234
DOCUMENT INSPECTION APPARATUS
Filed Oct. 15, 1965  6 Sheets-Sheet 4
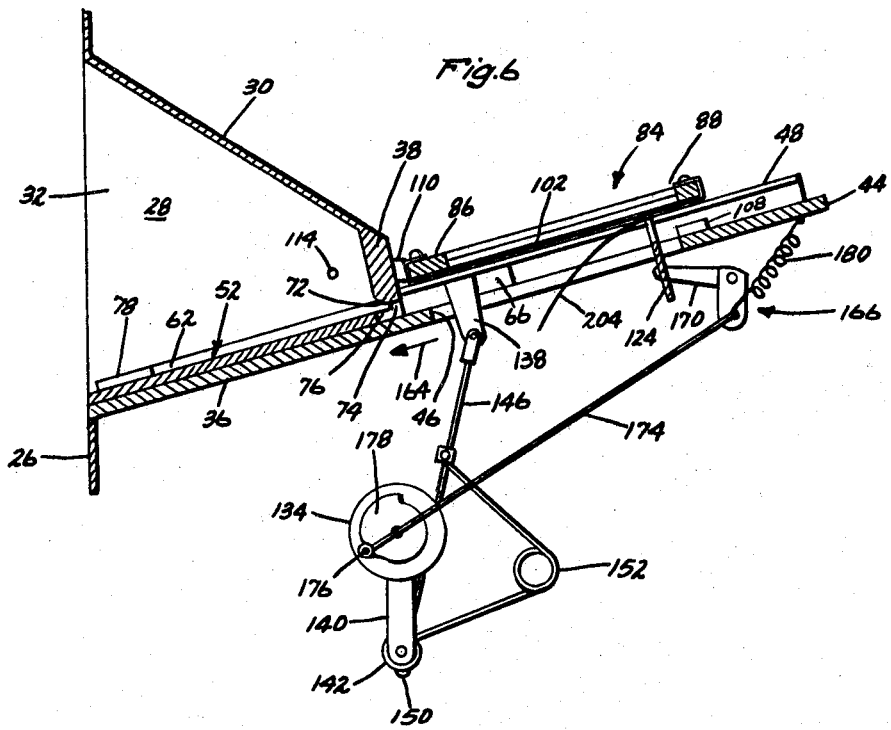
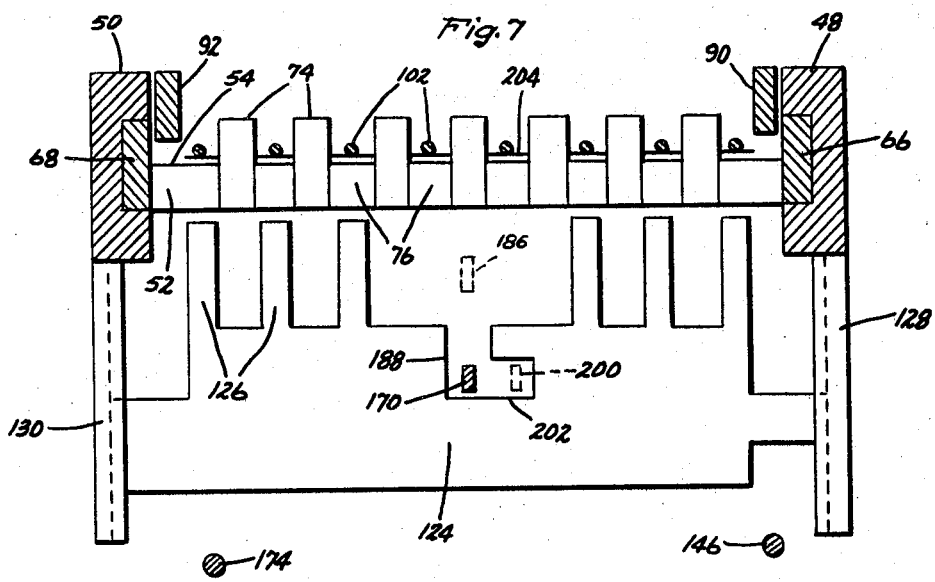
Inventor:
Owen E. Elmore,
by Hood, Gust & Irish
Attorneys.

May 21, 1968        O. E. ELMORE        3,384,234
DOCUMENT INSPECTION APPARATUS
Filed Oct. 15, 1965        6 Sheets-Sheet 5
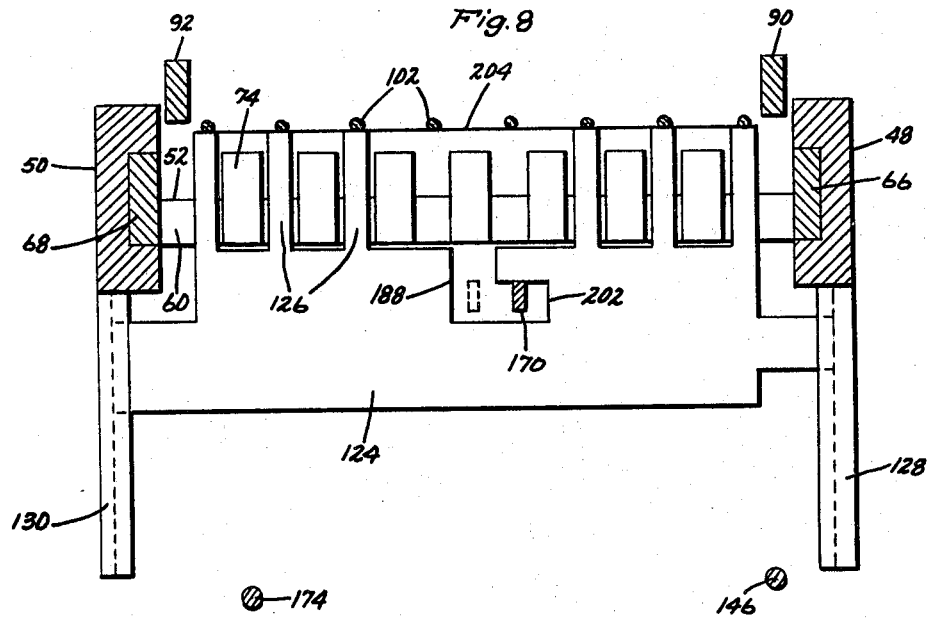
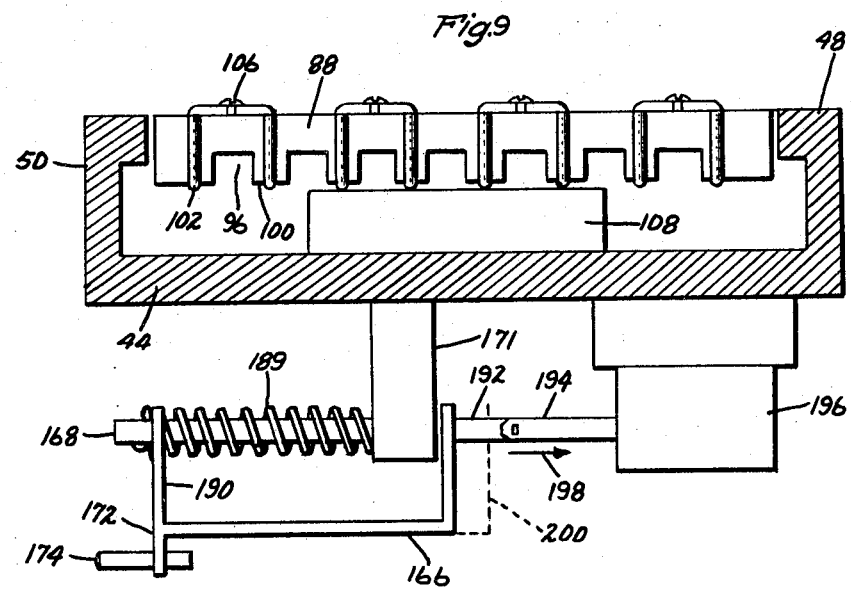
Inventor:
Owen E. Elmore,
by Ward, Gust & Irish
Attorneys.

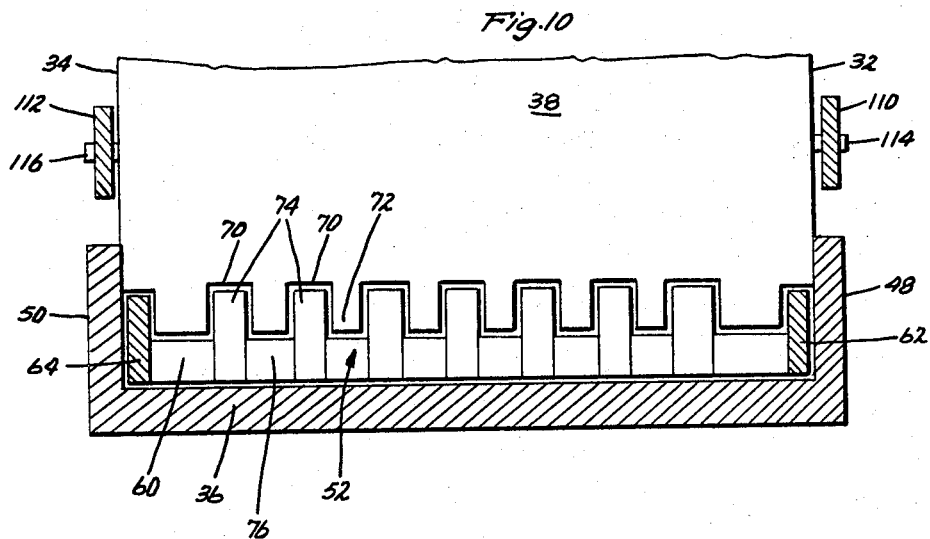
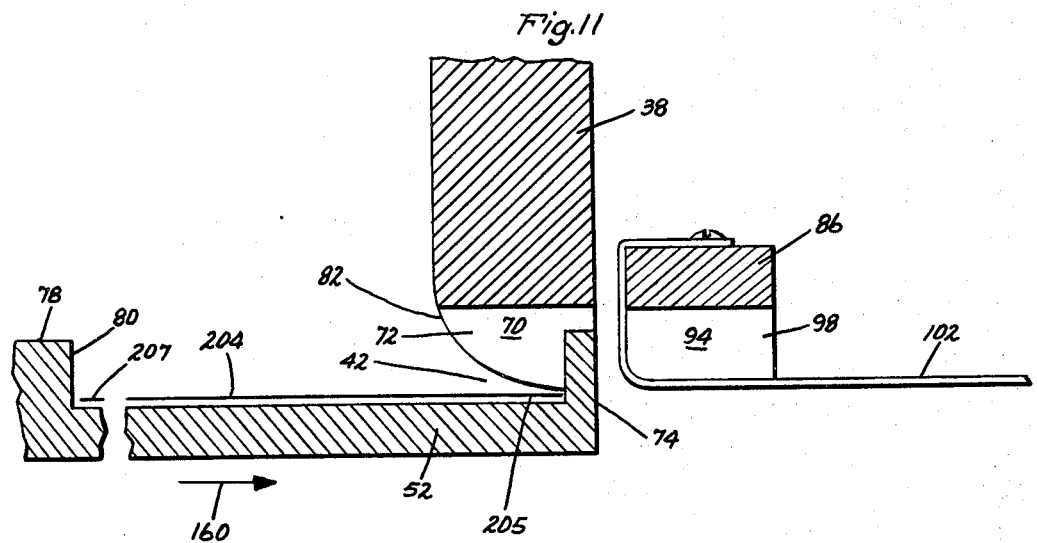

United States Patent Office 3,384,234
Patented May 21, 1968

3,384,234
DOCUMENT INSPECTION APPARATUS
Owen E. Elmore, Indianapolis, Ind., assignor to Vendit, Inc., Tipton, Ind., a corporation of Indiana
Filed Oct. 15, 1965, Ser. No. 496,313
17 Claims. (Cl. 209—73)

ABSTRACT OF THE DISCLOSURE

A tray assembly for document inspection apparatus for receiving a document, presenting it for inspection and removing an accepted document or returning a rejected document. A generally rectangular tray is provided having spaced, parallel, longitudinally extending projections formed on its upper side respectively adjacent its front and rear edges and defining a recess therebetween for receiving a document to be inspected, the rear edge having slots extending forwardly between the projections. The tray is longitudinally movable in a frame between a forward loading position and a rear inspection position. A wall extends upwardly between the two tray positions and has a bottom edge defining an opening through which the tray moves, the wall having a plurality of spaced cut-out portions defining projections with the tray projections being in longitudinal alignment with the wall cut-out portions and proportioned to pass therethrough so that the rear tray projections close the wall cut-out portions when the tray is in its forward position and the front tray projections close the wall cut-out portions when the tray is in its rear position. A plurality of spaced, parallel wires are provided normally closely spaced above the upper surface of the tray in its rear position and in longitudinal alignment with the wall projections. A gripping member is provided having a plurality of spaced upstanding projections respectively in alignment with the slots in the rear edge of the tray when it is in its rear position, the gripping member being movable between a lower position and an upper position in which the projections thereof extend upwardly through the slots of the tray in its rear position respectively engaging the wires thereby to grip a document in the tray against the wires, the gripping member projections elevating the wires above the upper surface of the tray so that a document is removed from the tray recess as the tray is returned to its forward position.

---

This invention relates generally to apparatus for inspecting documents, such as for the genuineness and/or denomination of paper currency, and more particularly to an assembly for receiving a document to be inspected, presenting it for inspection and removing an accepted document or returning a rejected document.

Apparatus for determining the genuineness and denomination of paper currency, such appartaus being employed for making change and/or in conjunction with vending machines, is described and illustrated in Patent No. 3,220,548, of Lan J. Wong, and application Ser. No. 474,785, filed July 26, 1965, of Don R. Aufderheide, both assigned to the assignee of the present application. That apparatus and other commercially available currency inspection apparatus conventionally comprises an enclosing housing, validation apparatus located within the housing for performing appropriate tests upon the bill presented for inspection, a tray normally positioned outside of the housing for receiving a bill to be inspected and movable into the housing for presenting the bill to the validation apparatus and for returning a rejected bill, and gripping apparatus within the housing for removing a validated bill from the tray in response to detection of a valid bill by the validation apparatus.

Wrinkled bills are frequently presented for inspection, and it is therefore desirable that such inspection apparatus be capable of smoothly moving a wrinkled bill from the loading to the inspection position and returning the bill, if rejected, to the loading position without the bill becoming snagged or caught and thus, jamming the apparatus. It is further highly desirable to provide means for affirmatively preventing cheating the apparatus either by pilferage of a validated bill or by insertion and manipulation of appropriately colored paper to produce an erroneous "accept" signal from the validation apparatus. It is also desirable that the apparatus be arranged to inhibit the entrance of liquids, rain and/or foreign material such as dust or grit. Finally, it is desirable that movement of the tray be power-actuated through a complete cycle so that a customer need only place a bill in the tray in its loading position and push an actuating button, such power actuation of the tray further inhibiting the above-mentioned cheating of the apparatus.

It is accordingly an object of the invention to provide improved means for use in document inspection apparatus for receiving a document to be validated, presenting a document for inspection and removing a validated document or returning a rejected document.

Another object of the invention is to provide an improved tray assembly for document inspection apparatus in which jamming of the apparatus by a wrinkled document is inhibited.

A further object of the invention is to provide an improved tray assembly for document inspection apparatus in which entry of liquids and/or foreign matter into the apparatus is inhibited.

Yet another object of the invention is to provide an improved tray assembly for document inspection apparatus in which cheating of the apparatus is inhibited.

A still further object of the invention is to provide an improved power actuated tray assembly for document inspection apparatus.

In accordance with the broader aspects of the invention, tray means are provided having an upper surface for receiving a document to be inspected, the tray means being selectively movable between a first loading position and a second document inspection position. Document holding means are provided overlaying the upper surface of the tray means in its second position and gripping means are provided selectively movable between a first normal position below the tray means in its second position and a second position in engagement with the holding means. When the tray means with a document therein and the gripping means are in their respective second positions, the gripping means grips the document against the holding means so that the document is removed from the tray means upon return movement of the tray means from its second position to its first position.

The above-mentioned and other features and objects of this invention and the manner of attaining them will become more apparent and the invention itself will be best understood by reference to the following description of an embodiment of the invention taken in conjunction with the accompanying drawings, wherein:

FIG. 4 is a fragmentary cross-sectional view taken generally along the line 4—4 of FIG. 1, but showing the tray in its inspection position;

FIG. 5 is a fragmentary cross-sectional view taken generally along the line 5—5 of FIG. 1, but showing the tray in its inspection position and the gripping apparatus engaging an inspected document;

FIG. 6 is a fragmentary cross-sectional view taken generally along the line 6—6 of FIG. 1 showing the tray returned to its loading position and with a document removed therefrom by the gripping mechanism;

FIG. 7 is a fragmentary cross-sectional view taken along the line 7—7 of FIG. 4 showing the gripping member lowered;

FIG. 8 is a fragmentary cross-sectional view taken along the line 8—8 of FIG. 5 showing the gripping member raised;

FIG. 9 is a fragmentary, cross-sectional view taken along the line 9—9 of FIG. 2;

FIG. 10 is a fragmentary cross-sectional view taken along the line 10—10 of FIG. 2; and FIG. 11 is an enlarged fragmentary cross-sectional view of the wall and tray illustrating initial guiding of the document.

Figure 1:
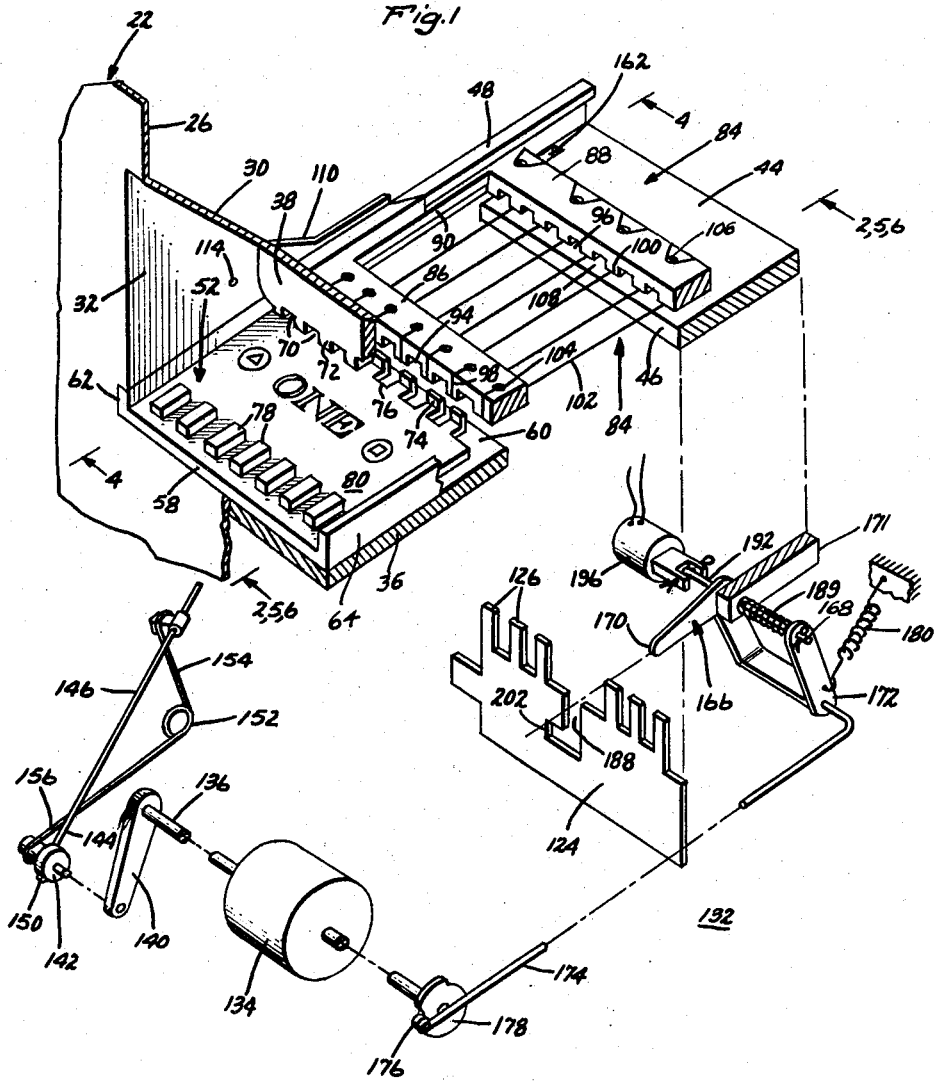
FIG. 1 is a fragmentary view in perspective, partly exploded and partly broken away, illustrating the improved slide assembly of the invention.

Referring now to the figures of the drawings, the improved slide assembly of the invention, generally indicated at 20, is shown in conjunction with a housing 22 for document inspection apparatus in which validation apparatus, generally indicated at 24, which may be of the type described and illustrated in the aforesaid Wong patent or Aufderheide application, is disposed. Housing 22 includes a front wall 26 having a recess 28 formed therein defined by a downwardly sloping wall 30, side walls 32 and 34 and an upwardly inclined bottom wall 36. An upwardly extending wall 38 is provided separating the exteriorly facing recess 28 from the interior of housing 22, wall 38 extending transversely between the side walls 32, 34 and being joined to the top wall 30. Wall 38 has a bottom edge 40 which is spaced from the upper surface of the bottom wall 36 to define a transversely extending opening 42 therewith.

The bottom wall 36 forms a part of the slide assembly 20 and has a portion 44 extending inwardly into the interior of the housing 22, portion 44 having an enlarged opening 46 formed therein rearwardly of the transverse wall 38.

Figure 2:
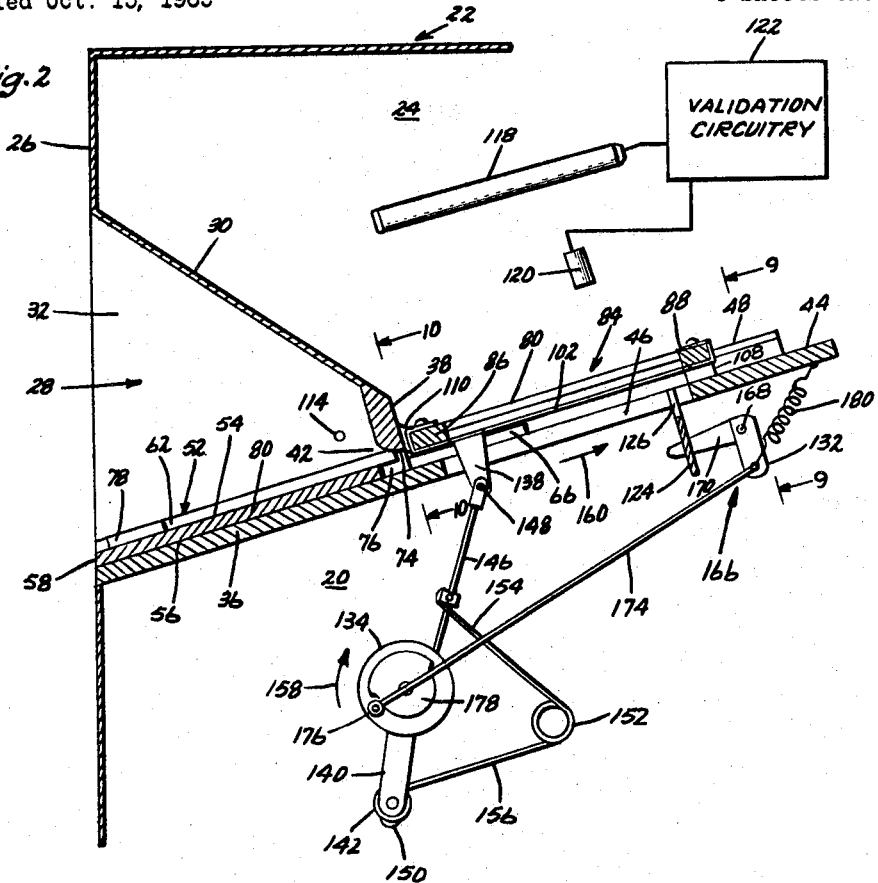
FIG. 2 is a fragmentary cross-sectional view taken generally along the line 2—2 of FIG. 1 showing document inspection apparatus incorporating the slide assembly of the invention with the tray in its loading position.

A pair of transversely spaced-apart, parallel, longitudinally extending guide members 48, 50 are attached to the opposite sides of the bottom wall 36, 44 and extend into the interior of the housing 22 through the opening 42 defined by the transverse wall 38. A generally flat, rectangular tray 52 is provided having upper and lower surfaces 54, 56, longitudinally spaced front and rear edges 58, 60 and transversely spaced side edges having upwardly extending flange portions 62, 64 respectively formed thereon and cooperatively engaging the guide members 48, 50 for guiding the tray 52 for longitudinal movement between its exterior loading position, as shown in FIGS. 1, 2 and 6, and its interior inspection position as shown in FIGS. 4 and 5. Flange portions 62, 64 respectively have projections 66, 68 which extend into the interior of the housing 22 on either side of opening 46 when the tray 52 is in its exterior loading position.

The bottom edge 40 of the transverse wall 38 has a plurality of transversely spaced-apart, longitudinally extending serrations or cut-out portions 70 formed therein respectively defining downwardly extending projections 72 therebetween. The rear edge 60 of the tray 52 has a plurality of transversely spaced-apart, upwardly extending serrations or projections 74 formed thereon, projections 74 being respectively in longitudinal alignment with the cut-out portions 70 in the wall 38. Inwardly extending slots 76 are respectively formed in the rear edge 60 of the tray 52 between the projections 74. Projections 74 are proportioned to pass through the cut-out portions 70 in the wall 38 and as best seen in FIGS. 1, 2 and 10, when the tray 52 is in its exterior loading position, projections 74 are positioned in and substantially close the cut-out portions 70, the projections 72 defined between the cut-out portions 70 likewise extending into and substantially closing the space between the projections 74.

A plurality of transversely spaced-apart, longitudinally extending serrations or projections 78 are formed on the upper surface 54 of the tray 52 adjacent the front edge 58, projections 78 being respectively in longitudinal alignment with the projections 74 at the rear edge 60 of the tray 52. Projections 74, 78 are thus longitudinally spaced-apart to define with the upper surface 54 of the tray 52 a recess 80 for receiving a document to be inspected. Projections 78 are likewise proportioned to pass through the cut-out portion 70 in the wall 38, and, as best seen in FIGS. 4 and 5, when the tray 52 is in its inner inspection position, projections 78 are respectively positioned in and substantially close the cut-out portions 70, the projections 72 defined between the cut-out portion 70 likewise extending into and substantially closing the spaces between the projections 78. In the illustrated embodiment in which tray 52 and projections 74, 78 are integrally cast, projections 78 are initially cast with appreciable longitudinal length to permit milling out a larger recess 80 for accommodating certain foreign currency which is larger than United States currency.

As best seen in FIGS. 5 and 11, the forward surfaces of the projections 72 of the wall 38 are curved downwardly and rearwardly, as at 82, in order to facilitate guiding a document 204 in the recess 80 into the interior of the housing 22. In the illustrated embodiment intended for inspecting for the genuineness and/or the denomination of one dollar United States paper currency, the upper surface 54 of the tray 52 within the recess 80 has suitable indicia thereon to indicate which side of the bill should be placed upwardly and how the bill should be oriented as shown in FIG. 1.

A document hold-down member 84 is provided in the interior of the housing 22 adjacent the transverse wall 38 overlaying opening 46 in the bottom wall 36, 44 and thus overlaying tray 52 in its inner inspection position, as best seen in FIGS. 4 and 5. In the illustrated embodiment, the hold-down member 84 comprises a generally rectangular frame element having forward and rear cross members 86, 88 and side members 90, 92, the forward and rear cross members 86, 88 respectively have cut-out portions 94, 96 formed in their lower surfaces respectively in alignment with the tray projections 74, 78 and respectively defining downwardly extending projections 98, 100 therebetween. A plurality of transversely spaced-apart, parallel, longitudinally extending wires 102 are provided extending longitudinally between the cross elements 86, 88 respectively in alignment with and engaging the projections 98, 100. Wires 102 may be secured to the upper surfaces of the cross members 86, 88 by means of suitable threaded fasteners 104, 106. It will thus be seen that wires 102 are respectively in longitudinal alignment with the spaces between the projections 74, 78 of the tray 52. The front cross element 86 is positioned closely adjacent the transverse wall 38 and thus, when the tray 52 is in its rear inspection position, tray projections 78 extend into the cut-out portions 94 substantially closing the same, and the forward portions of the wires 102 respectively extend into the openings or slots defined between the projections 78, as best seen in FIG. 4. The rear cross element 88 normally rests upon a support 108 on portion 44 of bottom wall 36 and the wires 102 are thus normally positioned closely adjacent the upper surface 54 of the tray 52, as best seen in FIGS. 4 and 7.

The hold-down assembly 84 is mounted for pivotal upward movement with respect to the bottom wall 36, 44 by means of a pair of lever members 110, 112 respectively attached to the side elements 90, 92 and respectively pivotally mounted on side walls 32, 34 as at 114, 116. The hold-down assembly 84 may thus be raised to an upper position with the wires 102 raised above projections 74, 78 of the tray 52, as best seen in FIGS. 5 and 6.

It will be seen that the wires 102, being spaced-apart, define apertures which expose the upper surface of the document in the tray recess 80 when the tray 52 is in its inner inspection position, as shown in FIG. 4. In the illustrated embodiment, validation apparatus 24 comprises a light source 118 disposed within the housing 22 so as to direct light onto the thus-exposed surface of the document to be inspected, the light reflected from the exposed surface of the document being detected by sensors 120 coupled to validation circuitry 122. The light source 118, sensors 120 and validation circuitry 122 may be of the types described and illustrated in the aforesaid Wong patent and Aufderheide application; however, the particular validation apparatus and method employed does not form a part of the present invention, and other methods and apparatus for subjecting the document to desired tests to determine its genuineness and/or denomination in the case of a piece of paper currency may be employed.

In order to remove a validated document from the tray 52 while in its inner inspection position in response to an "accept" signal provided by the validation circuitry 122, a gripping member 124 is provided having a plurality of upwardly extending projections 126 formed on its upper edge. Gripping member 124 is disposed transversely of the guide members 48, 50 with its projections 126 normally extending upwardly into the opening 46 in the bottom walls 36, 44, but with their upper extremities normally below the upper surface 54 of the tray 52. Projections 126 of the gripping member 124 are respectively disposed in longitudinal alignment with the slots 76 in the rear edge 60 of the tray 52, as best seen in FIGS. 7 and 8. Gripping member 124 is mounted for vertical movement with respect to the bottom wall 36, 44 and the tray 52 by means of suitable guide members 128, 130 attached to and extending downwardly from the guide members 48, 50, as best seen in FIGS. 7 and 8. As will be hereinafter described, gripping member 124 is upwardly movable from its normal lower position, as shown in FIGS. 2, 4 and 7, to an upward position, as shown in FIGS. 5, 6 and 8, in which the upper edges of the projections 126 respectively engage the wires 102, projections 126 extending upwardly through the slots 76 in the rear edge 60 of tray 52 and moving the guiding and holding assembly 84 upwardly by engagement with the wires 102, as best seen in FIGS. 5 and 8.

The tray 52 is reciprocally moved between its outer loading and inner inspection positions and the gripping member 124 is moved between its lower normal position and its upper position with projections 126 engaging wires 102 and elevating the guiding and holding member 84 by means of power actuating assembly 132 now to be described.

A drive motor 134 is provided, which may be a conventional gear motor, which, with conventional timing cams and circuitry (not shown), will drive its shaft 136 through one revolution in response to a single actuation of an appropriate switch or starting button (also not shown). A member 138 is attached to the projection 66 of flange portion 62 of tray 52 and extends downwardly through opening 46. A bell crank 140 is secured to motor shaft 136 and rotates therewith. Member 142 is rotatably mounted on the end of the bell crank 140 and has end 144 of link 146 slidably received therein, the other end 148 of the link 146 being pivotally connected to the end of the member 138. End 144 of link 146 has a stop portion 150 normally engaged by the member 142. A spring member 152 has one end 154 secured to the link 146 intermediate its ends 144, 148 and has its other end 156 secured to the member 142.

It is desirable to provide a momentary dwell interval when the tray 52 is in its inner inspection position in order to permit validation of the document by the validation circuitry 24 and actuation of the gripping member 124. This dwell is provided by the lost-motion connection provided by the spring 152 and the sliding connection of the end 144 with the member 142. Thus, rotation of shaft 136 and the bell crank 140 from the position shown in FIG. 2 in the direction shown by the arrow 158 will result in inward movement of the tray 52 toward its inner inspection position as shown by the arrow 160, spring 152 maintaining stop portion 150 of link 146 against the member 142. Continued rotation of shaft 136 and the bell crank 140 in the direction shown by the arrow 158 will thus move the tray 52 inwardly to its inspection position, as shown in FIG. 4, a slot 162 in bottom wall portion 44 accommodating the final movement of the member 138.

Further rotation of shaft 136 and the bell crank 140 through the top dead-center position results in stop portion 150 of the link 146 moving away from the member 142 against the force exerted by the spring 152 thereby providing a lost motion connection and the requisite dwell interval for the tray 52 in its inner inspection position. Still further rotation of the bell crank 140 in the direction shown by the arrow 158 will result in member 142 again engaging stop portion 150 of the link 146 and return movement of the tray 52 from its inner inspection position to its outer inspection position in the direction shown by the arrow 164, as shown in FIG. 6. It will be readily understood that the particular lost motion connection between bell crank 140 and tray 52 provided by member 142, link 146 and spring 152 is shown for illustrative purposes only and that other conventional lost-motion connections to provide the requisite dwell interval for the tray 52 in its inner inspection position may be employed.

In order to actuate the gripping member 124, a lever member 166 is provided pivotally mounted on a shaft 168 supported for axial movement by a projection 171 depending from portion 44 of the bottom wall 36. Lever member 166 has an actuating end 170 and an actuated end 172 which is coupled by link 174 to a suitable cam follower 176 which cooperatively engages cam 178 on motor shaft 136. Lever member 166 is normally biased so that end 170 is in its downward position by means of a suitable spring 180 connected between end 172 and portion 44 of bottom wall 36. Cam 178 is proportioned to move link 174 in the direction shown by the arrow 182 and thus, to pivot end 170 upwardly about shaft 168, as shown by the arrow 184, during the dwell interval when the tray 52 is in its inner inspection position, all as shown in FIG. 5. End 170 of the lever member 166 normally pivots ineffectively between its normal position shown in solid lines and its actuated position shown in dashed lines 186 in slot 188 formed in gripping member 124, as best seen in FIG. 7, it being recalled that the end 170 of the lever member 166 is normally biased to the position shown in solid lines in FIG. 7 by means of spring 180.

Figure 3:
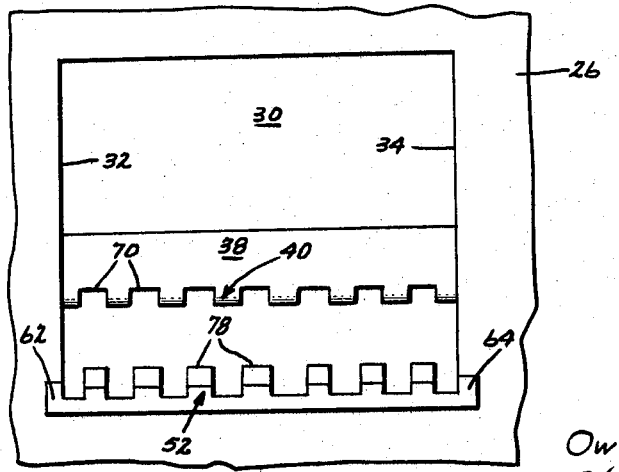
FIG. 3 is a fragmentary front view of document inspection apparatus incorporating the slide assembly of the invention.

A suitable coil spring 189 surrounds shaft 168 and normally biases lever member 166 to the position shown in FIGS. 1 and 9 by engagement between depending portion 171 and portion 190 of the lever member 166. Shaft 168 has an extension 192 connected to the armature 194 of a suitable solenoid 196 mounted on the lower side of portion 44 of the bottom wall 36. Solenoid 196 is coupled to the validation circuitry 122 and is energized in response to an "accept" signal. Energization of solenoid 196 results in axial movement of armature 194, shaft 192 and lever member 166 in the direction shown by the arrow 193 so that the lever member 166 and its end 170 are moved to the position shown in dashed lines 200 in FIGS. 7 and 9, end 170 thus moving axially into extension portion 202 of the slot 188 in the gripping member 124. With the solenoid 196 thus energized and end 170 of lever member 166 thus moved axially as above-described, actuation of link 174 by means of cam follower 176 and cam 178 and the resultant upward movement of end 170 of lever 166 as shown by the arrow 184 will result in actuation of the gripping member 124 to its upper position, as shown in FIGS. 5 and 8. For a purpose to be hereinafter described, cam 178 is proportioned to retain end 170 of lever member 166 and gripping member 124 in their upper positions until tray 52 has been virtually returned to its forward loading position, as shown in FIG. 6, final rotation of shaft 136 together with cam 178 and bell crank 140 in the direction shown by the arrow 158 from the position shown in FIG. 6 to the initial position shown in FIG. 3 resulting in the cam follower 176 riding off of the high portion of cam 178 so that the lever member 166 and gripping member 124 are returned to their normal positions under the influence of spring 180, as shown in FIG. 2.

It will be understood that end 170 of lever member 166 pivots upwardly and downwardly once for each rotation of shaft 136 and cam 178, lever member 166 being actuated by solenoid 196 to actuate gripping member 124 only in response to an "accept" signal provided by the validation circuitry 122. It will further be understood that the above-described linkage and mechnism for actuating gripping member 124 during the dwell interval of tray 52 and in response to an "accept" signal from the validation circuitry 122 is shown for illustrative purposes only and that other conventional linkages and mechanisms may be employed for actuating gripping member 124 during the dwell interval of tray 52 in response to an "accept" signal of the validation circuitry.

*Operation*

A document 204 to be inspected, such as a one dollar United States bill, is placed in the recess 80 of the tray 52 with its top or leading edge 205 under the curved surfaces 82 of projections 72 of wall 38 and against the projections 74, as best seen in FIG. 11. It will be seen that the curved surfaces 82 initially flatten the leading edge of the bill so that it is guided through opening 42 as the tray 52 is moved rearwardly, as shown by the arrow 160. Recess 80 is proportioned so that when the leading edge 205 of the bill 204 is inserted under curved surfaces 82 and abutted against projections 74, the trailing edge 207 just clears projections 78 thus fitting into the recess 80. The use of a hold-down frame or cover for the recess 80, required in prior apparatus, is thus eliminated.

The start button (not shown) is then actuated to energize motor 134 to initiate one cycle of operation, i.e., movement of the tray 52 from its forward loading position to its rear inspection position and return movement to its forward position. As rearward movement of tray 52 is initiated, the rear projections 74 immediately move into the slots 94 in cross element 86 of hold-down assembly 84 with the bill in the recess 80 thus being guided under the wires 102. When tray 52 with the bill in the recess 80 has reached its rearmost position, as shown in FIG. 4, movement of the tray 52 is halted for a brief period and the tray and the bill are thus held stationary for inspection by the validation apparatus during the dwell interval provided by the lost motion connection of the link 146 with the bell crank 140. The validation apparatus, 118, 120, 122 is actuated during the dwell interval by conventional means such as a limit switch actuated by the tray 52 or timing cams driven by motor 134 (not shown) and if the bill is found to be genuine and of the proper denomination, an "accept" signal is provided.

If an "accept" signal is provided, solenoid 196 is energized to pull shaft 168 and lever 166 to the right as viewed in FIG. 9 so that end 170 of lever 166 moves into portion 202 of slot 188, continued rotation of motor shaft 136 and cam 178 thus actuating cam follower 176 and link 174 to pivot lever member 166 so that end 170 moves gripping member 124 upwardly as shown in FIG. 5. Projections 126 of the gripping member 124 thus move upwardly through slots 76 in the rear edge of tray 52 and grip the bill 204 against wires 102 and at the same time elevate hold-down member 84 so that the wires 102 and the gripped edge of the bill are elevated above projections 74 of the tray 52 as shown in FIGS. 5 and 8. Continued rotation of motor shaft 136 in direction 158 now initiates return movement of slide 52 toward its loading position, cam 178, however, still retaining link 174 and end 170 of lever member 166 in its pivoted position so as to hold gripping member 124 in its upper position with the bill 204 thus still gripped against wires 102. Projections 74 of tray 52 thus move forwardly between projections 126 of the gripping member 124 and under the gripped bill 204, leaving the bill 204 thus exposed to the opening 46 as shown in FIG. 6. Close to the end of the cycle of operation, cam follower 176 rides off of the high portion of cam 178, thus permitting spring 180 to return lever member 166 to its normal position with gripping member 124, thus being moved downwardly so as to release bill 204 which then falls into a suitable receptacle (not shown). When the tray 52 is fully returned to its loading position, operation of motor 134 is terminated by a suitable limit switch or cam-actuated contact (not shown) and the cycle of operation is completed.

If, however, an "accept" signal had not been provided by the validation assembly 118, 120, 122, solenoid 196 would not have been energized and end 170 of lever member 166 would thus have been pivoted upwardly and downwardly ineffectively in slot 188 of gripping member 124. Gripping member 124 thus would not have been moved to its upper position so as to grip the bill 204 against wires 102, the guiding and holding member 84 would not have been raised, and the bill 204 would thus remain in recess 80 in tray 52 and be returned under wires 102 to the loading position of tray 52 for removal.

It will not be observed that the inclination of tray 52 which, in the specific embodiment of the invention, is 20 degrees, inhibits the entry of liquids, rain and/or foreign materials such as dust and grit into the interior of housing 22, such liquids and/or foreign material tending to fall out of the apparatus by gravity. It will further be observed that in the normal position of the apparatus with the tray 52 in its forward loading position, the rear projections 74 substantially close cut-out portions 70 in the bottom edge 40 of wall 38 thus further inhibiting the entrance of foreign matter into the interior of housing 22.

In certain prior bill changing apparatus, it has been possible for a person bent upon cheating the apparatus to slip one or more pieces of appropriately colored paper into the inspection zone and by proper manipulation of these pieces of paper to produce an "accept" signal thereby making change and/or actuating a vending machine with no bill in fact having been presented. It has further been possible in such prior apparatus to slip an appropriate implement into the interior of the housing and to pilfer a validated bill from the bill removing apparatus. It will be observed that in the apparatus of the invention when the tray 52 is in its inner inspection position, cut-out portions 70 in wall 38 are substantially closed by the tray projections 78, thus positively preventing insertion of paper into the interior of the housing 22 for "cheating" the validation apparatus or inserting an implement for pilfering a validated bill.

It will finally be observed that a validated bill is gripped by the gripping member 124 against the wires 102 at a plurality of points spaced substantially across rear edge 205 of the bill, thus raising the wires away from the tray 52, the hold-down effect of the wires which serve to guide a rejected bill back under the projection 72 of the wall 38 being destroyed, thus further inhibiting pilfering of a validated bill. The bottom edges of the projections 72 of wall 38 are closely spaced from the upper surface 54 of tray 52 and with the hold-down effect provided by the wires 102 eliminated, it is virtually impossible to "snag" an accepted bill and to pull it "blind" through the narrow opening defined between the bottom edges of the projections 72 and the upper surface 54 of tray 52. Furthermore, the rapid cycle provided by the drive motor 134, i.e., one and one half seconds in a specific embodiment, provides insufficient time for manipulation of any pilfering instrument.

While power actuated drive means for the tray 52 has been illustrated and described, it will be readily apparent that the tray 52 may be manually moved between its forward loading and its rear inspection positions with the gripping member 124 actuated at the appropriate time by a solenoid energized by the validation apparatus.

While there have been described above the principles of this invention in connection with specific apparatus, it is to be clearly understood that this description is made only by way of example and not as a limitation to the scope of this invention.

What is claimed is:

1. In document inspection apparatus, an assembly for receiving a document, presenting it for inspection and removing an accepted document or returning a rejected document, said assembly comprising: tray means having an upper surface for receiving a document to be inspected and having at least one aperture therein, said tray means being selectively movable between a first loading position and a second inspection position; document holding means overlaying said upper surface of said tray means in said second position thereof and defining at least one aperture therein for exposing one surface of said document; gripping means selectively movable between a first normal position below said tray means in said second position thereof and a second position in engagement with said holding means, said gripping means in said second position thereof extending through said aperture in said tray means in said second position thereof thereby gripping said document against said holding means whereby said document is removed from said tray means upon movement of the same from said second position to said first position thereof; and a wall between said first and second positions of said tray means, said wall being disposed transversely of the direction of said tray means movement and having a bottom edge, said tray means being movable beneath said bottom edge; said wall edge having serrations therein, said tray means upper surface having at least one group of serrations thereon which cooperatively mate with said wall edge serrations when said tray means is in one of said positions thereof.

2. The assembly of claim 1 wherein said tray means upper surface has first and second groups of serrations thereon spaced-apart in the direction of movement of said tray means and defining a recess therebetween for receiving said document, said first group of serrations cooperatively mating with said edge serrations when said tray means is in said first position thereof thereby inhibiting pilferage of a document removed by said gripping means, said second group of serrations cooperatively mating with said edge serrations when said tray means is in said second position thereby inhibiting pilferage of a document from said tray means in said second position thereof.

3. In document inspection apparatus, an assembly for receiving a document, presenting it for inspection and removing an accepted document or returning a rejected document, said assembly comprising: tray means having an upper surface for receiving a document to be inspected and having at least one aperture therein, said tray means being selectively movable between a first loading position and a second inspection position; document holding means overlaying said upper surface of said tray means in said second position thereof and defining at least one aperture therein for exposing one surface of said document; and gripping means selectively movable between a first normal position below said tray means in said second position thereof and a second position in engagement with said holding means, said gripping means in said second position thereof extending through said aperture in said tray means in said second position thereof thereby gripping said document against said holding means whereby said document is removed from said tray means upon movement of the same from said second position to said first position thereof; said holding means comprising a plurality of spaced, parallel elongated wires extending in the direction of said tray means movement, said wires defining a plurality of said apertures therebetween, said gripping means in said second position thereof engaging said wires.

4. In document inspection apparatus, an assembly for receiving a document, presenting it for inspection and removing an inspected document or returning a rejected document, said assembly comprising: a generally rectangular tray having an upper surface for receiving a document to be inspected and having longitudinally spaced front and rear edges; frame means for supporting said tray for selective longitudinal movement between a first loading position and a second inspection position; means overlaying said tray in said second position thereof for holding said document on said tray during movement of the same into said second position, said holding means defining at least one aperture therein for exposing one surface of said document; a gripping member normally disposed below said tray in said second position thereof; means for supporting said gripping member for selective movement between a first lower position and a second upper position, said gripping member having a portion engaging said holding means in said second position of said gripping member, said portion of said gripping member in said second position thereof gripping said document against said holding means whereby said document is removed from said tray upon movement of the same from said second position to said first position thereof; and a wall extending upwardly between said first and second tray positions and transversely of the direction of tray movement, said wall having a bottom edge spaced from said tray and defining an opening therewith, said tray being movable through said opening, said bottom edge having a plurality of spaced-apart cut-out portions formed therein respectively defining projections therebetween; said tray having first and second pluralities of transversely spaced projections formed on said upper surface respectively adjacent said front and rear edges and defining a recess therebetween for receiving said document, said tray projections being respectively in alignment with said wall cut-out portions and proportioned to pass therethrough, said first plurality of tray projections being positioned in said wall cut-out portion when said tray is in said second position thereof thereby inhibiting pilferage of a document from said tray in said second position, said second plurality of tray projections being positioned in said wall cut-out portions when said tray is in said first position thereby inhibiting pilferage of a document removed by said gripping member.

5. In document inspection apparatus, an assembly for receiving a document, presenting it for inspection and removing an inspected document or returning a rejected document, said assembly comprising: a generally rectangular tray having an upper surface for receiving a document to be inspected and having longitudinally spaced front and rear edges; frame means for supporting said tray for selective longitudinal movement between a first loading position and a second inspection position; means overlaying said tray in said second position thereof for holding said document on said tray during movement of the same into said second position, said holding means defining at least one aperture therein for exposing one surface of said document; and a gripping member normally disposed below said tray in said second position thereof; means for supporting said gripping member for selective movement between a first lower position and a second upper position, said gripping member having a portion engaging said holding means in said second position of said gripping member, said portion of said gripping member in said second position thereof gripping said document against said holding means whereby said document is removed from said tray upon movement of the same from said second position to said first position thereof; said holding means comprising a plurality of transversely spaced, parallel, longitudinally extending wires, said gripping member comprising a plurality of projections respectively engaging said wires in said second position thereof, said tray having a plurality of slots therein adjacent said rear edge through which said gripping member projections respectively extend when said gripping member and tray are respectively in said second positions.

6. The assembly of claim 5 wherein said wires are normally closely spaced from said upper surface of said tray in said second position thereof, and wherein said projections of said gripping member in said second position thereof elevate said wires away from said upper surface of said tray.

7. In document inspection apparatus, an assembly for receiving a document, presenting it for inspection and removing an inspected document or returning a rejected document, said assembly comprising: a generally rectangular tray having an upper surface for receiving a document to be inspected and having longitudinally spaced front and rear edges; frame means for supporting said tray for selective longitudinal movement between a first loading position and a second inspection position; means overlaying said tray in said second position thereof for holding said document on said tray during movement of the same into said second position, said holding means defining at least one aperture therein for exposing one surface of said document; a gripping member normally disposed below said tray in said second position thereof; means for supporting said gripping member for selective movement between a first lower position and a second upper position, said gripping member having a portion engaging said holding means in said second position of said gripping member, said portion of said gripping member in said second position thereof gripping said document against said holding means whereby said document is removed from said tray upon movement of the same from said second position to said first position thereof; selectively actuable power means, means operatively connecting said power means to said tray for reciprocally moving the same between said first and second positions, and selectively actuable means for moving said gripping member to said second position when said tray is in said second position thereof.

8. The assembly of claim 7 wherein said connecting means includes means for providing a dwell period in the movement of said tray at said second position thereof, and wherein said selectively actuable means includes means for actuating said gripping member during said dwell period.

9. In document inspection apparatus, an assembly for receiving a document, presenting it for inspection and removing an accepted document or returning a rejected document, said assembly comprising: a generally rectangular tray having upper and lower sides, longitudinally spaced front and rear edges and transversely spaced side edges, said tray having first and second pluralities of transversely spaced, parallel, longitudinally extending projections on said upper side respectively adjacent said front and rear edges and defining a recess therebetween for receiving a document to be inspected, said rear edge having slots formed therein respectively extending forwardly between said second plurality of projections; frame means including a pair of transversely spaced, parallel, longitudinally extending guide members respectively engaging said side edges of said tray for supporting the same for selective longitudinal movement between a first loading position and a second inspection position; a wall extending upwardly between said first and second tray positions and transversely of said guide members, said wall having a bottom edge defining an opening, said guide members extending through said opening whereby said tray is movable therethrough, said bottom edge having a plurality of spaced cut-out portions formed therein defining projections therebetween, said tray projections being respectively in longitudinal alignment with said wall cut-out portions and proportioned to pass therethrough, said second plurality of tray projections being respectively positioned in and substantially closing said wall cut-out portions in said first tray position, said first plurality of tray projections respectively extending through and substantially closing said wall cut-out portions in said second tray position; a plurality of transversely spaced parallel, longitudinally extending wires normally closely spaced above said upper surface of said tray in said second position thereof, said wires being respectively in longitudinal alignment with said wall projections whereby a document is retained in said tray as the same is moved from said first to said second position; a gripping member extending transversely of said guide members, said gripping member having a plurality of spaced upstanding projections respectively in alignment with said slots when said tray is in said second position; and means on said frame means for supporting said gripping member for selective movement between a first lower position and a second upper position, said projections of said gripping member in said first position thereof being disposed below said upper surface of said tray in said second position thereof, said projections of said gripping member in said second position thereof respectively extending upwardly through said slots of said tray in said second position thereof and respectively engaging said wires thereby gripping a document in said tray against said wires, said gripping member projections elevating said wires above said upper surface of said tray whereby a document is removed from said tray recess as said tray is returned to said first position thereof.

10. The assembly of claim 9 wherein said guide members are inclined upwardly from said first tray position toward said second tray position.

11. The assembly of claim 9 further comprising selectively actuable power means disposed below said tray, drive means operatively connecting said power means to said tray for reciprocally moving the same between said first and second positions thereof, said drive means including lost-motion means for providing a dwell period in the movement of said tray at said second position thereof, and selectively actuable means for moving said gripping member to said second position thereof during said dwell period.

12. In document inspection apparatus, an assembly for receiving a document, presenting it for inspection and removing an accepted document or returning a rejected document, said assembly comprising: tray means for receiving a document to be inspected; and means for supporting and guiding said tray means for selective movement between a forward loading position and a rear inspection position, said supporting and guiding means being inclined upwardly from the horizontal from said forward to said rear tray positions; said tray means being generally rectangular with forward and rear edges, said tray means having an upwardly extending wall formed thereon adjacent said forward edge, said wall having a plurality of apertures formed therein communicating with the upper surface of said tray whereby liquid and foreign material is conveyed away from said tray and apparatus when said tray is in said forward position.

13. In document inspection apparatus, an assembly for receiving a document, presenting it for inspection and removing an accepted document or returning a rejected document, said assembly comprising: tray means having an upper surface for receiving a document to be inspected and being selectively movable between a first loading position and a second inspection position; and a wall extending upwardly between said first and second positions of said tray means, said wall being disposed transversely of the direction of said tray means movement and having a bottom edge, said tray means being movable beneath said bottom edge, said wall edge having serrations therein, said tray means upper surface having at least one group of serrations thereon which cooperatively mate with said wall edge serrations when said tray means is in one of said positions thereof.

14. The assembly of claim 13 wherein said tray means upper surface has first and second groups of serrations thereon spaced apart in the direction of movement of said tray means and defining a recess therebetween for receiving said document, said first group of serrations cooperatively mating with said edge serrations when said tray means is in said first position thereof, said second group of serrations cooperatively mating with said edge serrations when said tray means is in said second position thereof.

15. The apparatus of claim 13 wherein said bottom edge of said wall has a plurality of longitudinally extending cut-out portions formed therein, and wherein said tray means has a rear edge with a plurality of spaced-apart upwardly extending projections formed thereon, said projections being respectively in longitudinal alignment with said cut-out portions, the rear edge of said document abutting said projections, said projections being respectively disposed in said cut-out portions in said forward position of said tray means.

16. In document inspection apparatus, an assembly for receiving a document, presenting it for inspection and removing an accepted document or returning a rejected document, said assembly comprising: tray means having an upper surface for receiving a document to be inspected and being selectively movable between a forward loading position and a rear inspection position; a wall extending upwardly between said forward and rear positions of said tray means, said wall being disposed transversely of the direction of said tray means movement and having a bottom edge, said tray means being movable beneath said bottom edge with said upper surface closely spaced therefrom; document holding means disposed on the side of said wall remote from said forward tray position and normally closely overlaying said upper surface of said tray means in said rear position thereof, said holding means being selectively upwardly movable away from said upper surface of said tray means; and gripping means disposed on the side of said wall remote from said forward tray position, said gripping means being selectively upwardly movable into engagement with said holding means and moving the same upwardly whereby said gripping means grips a document in said tray means in said rear position thereof against said holding means and moves said document away from said upper surface of said tray means thereby removing said document from said tray means upon movement of the same from said rear position to said forward position thereof.

17. The assembly of claim 16 wherein said holding means comprises a plurality of spaced, parallel, elongated wires extending in the direction of said tray means movement, and wherein said gripping means includes a plurality of upwardly extending projections which respectively engage said wires when said gripping means is moved upwardly.

References Cited

UNITED STATES PATENTS

| | | | |
|---|---|---|---|
| 1,596,503 | 8/1926 | Milfsud. | |
| 3,087,766 | 4/1963 | Gecewicz | 312—212 |
| 3,220,549 | 11/1965 | Wong | 194—4 |

ALLEN N. KNOWLES, *Primary Examiner.*